US006968308B1

(12) United States Patent
Brockett et al.

(10) Patent No.: US 6,968,308 B1
(45) Date of Patent: Nov. 22, 2005

(54) METHOD FOR SEGMENTING NON-SEGMENTED TEXT USING SYNTACTIC PARSE

(75) Inventors: Christopher J. Brockett, Bellevue, WA (US); Gary J. Kacmarcik, Bothell, WA (US); Hisami Suzuki, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 719 days.

(21) Appl. No.: 09/704,039

(22) Filed: Nov. 1, 2000

Related U.S. Application Data

(60) Provisional application No. 60/176,152, filed on Jan. 14, 2000, provisional application No. 60/166,045, filed on Nov. 17, 1999.

(51) Int. Cl.$^7$ .................................................. G06F 1/27
(52) U.S. Cl. ........................................................ 704/9
(58) Field of Search ............................. 704/9, 1, 4, 7, 704/10; 382/177; 715/530–535

(56) References Cited

U.S. PATENT DOCUMENTS

| | | | |
|---|---|---|---|
| 3,969,700 A | 7/1976 | Bollinger et al. | 340/146.3 |
| 4,942,526 A | 7/1990 | Okajima et al. | 364/419 |
| 5,029,084 A * | 7/1991 | Morohasi et al. | 704/9 |
| 5,168,533 A | 12/1992 | Kato et al. | 382/54 |
| 5,299,125 A | 3/1994 | Baker et al. | 364/419.08 |
| 5,305,396 A | 4/1994 | Betts et al. | 382/36 |
| 5,448,474 A | 9/1995 | Zamora | 364/419.1 |
| 5,469,354 A | 11/1995 | Hatakeyama et al. | 364/419.19 |
| 5,778,361 A | 7/1998 | Nanjo et al. | 707/5 |
| 5,806,021 A | 9/1998 | Chen et al. | 704/9 |
| 5,835,888 A * | 11/1998 | Kanevsky et al. | 704/9 |
| 5,917,941 A | 6/1999 | Webb et al. | 382/177 |
| 5,946,648 A | 8/1999 | Halstead, Jr. et al. | 704/9 |
| 5,963,893 A | 10/1999 | Halstead, Jr. et al. | 704/9 |
| 6,101,492 A * | 8/2000 | Jacquemin et al. | 707/3 |
| 6,175,834 B1 | 1/2001 | Cai et al. | 707/102 |
| 6,311,152 B1 * | 10/2001 | Bai et al. | 704/9 |
| 6,760,695 B1 * | 7/2004 | Kuno et al. | 704/9 |

FOREIGN PATENT DOCUMENTS

| | | | |
|---|---|---|---|
| WO | WO 98/08169 | * | 2/1998 |
| WO | WO 99/62001 | | 12/1999 |

OTHER PUBLICATIONS

Sproat et al., "A Stochastic Finite-State Word-Segmentation Algorithm for Chinese". Computational Linguistics, vol. 22:3, Sep. 1996.*

(Continued)

*Primary Examiner*—Richemond Dorvil
*Assistant Examiner*—Lamont Spooner
(74) *Attorney, Agent, or Firm*—Westman, Champlin & Kelly, P.A.

(57) ABSTRACT

Embodiments of the present invention provide a method and apparatus for segmenting text by providing orthographic and inflectional variations to a syntactic parser. Under the present invention, possible segments are first identified in the sequence of characters. At least two of the identified segments overlap each other. For at least one of the segments, an alternative sequence of characters is identified. In some cases, this alternative sequence is formed through inflectional morphology, which identifies a different lexical form for a word identified by the segment. In some cases, the alternative sequence represents an orthographic variant of a word identified by the segment. The identified segments and the alternative segments are then passed to a syntactic analyzer, which produces one or more syntactic parses. The segments found in the resulting parses represent the segmentation of the input sequence of characters.

24 Claims, 4 Drawing Sheets

OTHER PUBLICATIONS

Yeh et al., "Rule-Based Word Identification For Mandarin Chinese Sentences—A Unification Approach", for *Computer Processing of Chinese & Oriental Languages*, vol. 5, No. 2 (Mar. 1991).

Nie et al., "Unknown Word Detection and Segmentation of Chinese Using Statisatical and Heuristic Knowledge", for *Communication of COLIPS*, vol. 5, Nos. 1 & 2, p. 47-57 (Dec. 1995).

Teller et al., "A Probabilistic Algorithm for Segmenting Non-Kanji Japanese Strings", for Natural Language Processing (Jul. 31, 1994).

"Method of Segmenting Texts into Words" for *IBM Technical Disclosure Bulletin*, vol. 39, No. 11, pp. 115-118 (Nov. 1996).

Chen et al., "Word Identification for Mandarin Chinese Sentences" Proceedings of the 14th International Conference on Computational Linguistics, pp. 101-107, Nantes, France (Coling '92).

Wu et al., "Chinese Text Segmentation for Text Retrieval: Achievements and Problems", Journal of the American Society for Information Science, 44(9) : 532-542 (1993).

Chang et al., "A Multiple-Corpus Approach to Recognition of Proper Names in Chinese Texts", Computer Processing of Chinese and Oriental Languages, vol. 8, No. 1, pp. 75-85 (Jun. 1994).

Sproat et al., "A Stochastic Finite-State Word Segmentation Algorithm for Chinese", Computational Linguistics, vol. 22, No. 3, pp. 377-404 (1996).

Gan et al., "A statistically Emergent Approach for Language Processing: Application to Modeling Context Effects in Ambiguous Chinese Word Boundary Perception", Computational Linguistics, vol. 22, No. 4, pp. 531-553 (1996).

Guo, J., "Critical Tokenization and it Properties", Computational Linguistics, vol. 23, No. 4, pp. 569-596 (1997).

Yuan et al., "Splitting-Merging Model for Chinese Word Tokenization and Segmentation", Department of Information Systems & Computer Sciences, National University of Singapore (No date).

Huang et al., "A Quick Method for Chinese Word Segmentation", IEEE Conf. of Intelligent Processing Systems, p. 1773-1776 (Oct. 28-31, 1997).

Fan et al., "Automatic Word Identification in Chinese Sentences by the Relaxation Technique", Computer Processing of Chinese and Oriental Languages, vol. 4, No. 1, pp. 33-56 (Nov. 1988).

* cited by examiner

METHOD FOR SEGMENTING NON-SEGMENTED TEXT USING SYNTACTIC PARSE

CROSS-REFERENCE TO RELATED APPLICATION

This application claims priority from:

U.S. Provisional Patent Application No. 60/176,152 entitled "LATTICE AND METHOD FOR IDENTIFYING AND NORMALIZING ORTHOGRAPHIC VARIATIONS IN JAPANESE TEXT," filed on Jan. 14, 2000;

U.S. Provisional Patent Application No. 60/166,045 entitled "METHOD AND APPARATUS FOR SYNTAX PARSING CHARACTERS FROM NON SEGMENTED LANGUAGES," filed on Nov. 17, 1999; and U.S. Utility patent application Ser. No. 09/563,636 entitled "LATTICE AND METHOD FOR IDENTIFYING AND NORMALIZING ORTHOGRAPHIC VARIATIONS IN JAPANESE TEXT" filed on May 2, 2000.

FIELD OF THE INVENTION

The present invention relates generally to a computer-based method for identifying text. More particularly, the present invention relates to segmenting text having orthographic variations using a syntactic parse.

BACKGROUND OF THE INVENTION

Word segmentation refers to the process of identifying the individual words that make up an expression of language, such as text. Word segmentation is useful for checking spelling and grammar, synthesizing speech from text, performing natural language understanding, and searching a collection of documents for specific words or phrases.

Performing word segmentation of English text is rather straightforward, since spaces and punctuation marks generally delimit the individual words in the text. In non-segmented text like Japanese or Chinese, however, word boundaries are implicit rather than explicit. That is, non-segmented text typically does not include spaces or punctuation between words. Therefore, segmentation cannot be performed on these languages in the same manner as English word segmentation.

In most prior art systems, simple word breakers are utilized to segment the text. These word breakers typically group the characters into possible segments and then search for the segments in a lexicon. If a segment is found in the lexicon, it is kept as part of a possible segmentation of the text.

Using the lexicon technique, many segments may be identified that overlap each other and thus cannot exist in the same segmentation. To identify which of these competing segments is the actual segment for the text, some prior art systems utilize simple syntax rules. However, these simple rules are only applied against the characters that appear in the original string of text. They do not accommodate orthographic variations in the original text that, if properly identified, would lead to a different syntax.

Japanese in particular includes many orthographic variations for the same word that make it difficult to segment Japanese text using a syntactic parser. Many of these variations arise because Japanese utilizes four different scripts—kanji, hiragana, katakana and roman, and can spell the same word using different scripts or a combination of scripts.

Thus, a segmentation system is needed that properly accounts for orthographic variations while providing the segmentation advantages of syntactic parsing. The present invention provides a solution to this and other problems and offers other advantages over the prior art.

SUMMARY OF THE INVENTION

Embodiments of the present invention provide a method and apparatus for segmenting text by providing orthographic and inflectional variations to a syntactic parser. Under the present invention, possible segments are first identified in the sequence of characters. At least two of the identified segments overlap each other. For at least one of the segments, an alternative sequence of characters is identified. In some cases, this alternative sequence is formed through inflectional morphology, which identifies a different lexical form for a word identified by the segment. In some cases, the alternative sequence represents an orthographic variant of a word identified by the segment.

The identified segments and the alternative segments are then passed to a syntactic analyzer, which produces a full syntactic parse. The segments found in the resulting parse represent the segmentation of the input sequence of characters.

DETAILED DESCRIPTION OF ILLUSTRATIVE EMBODIMENTS

Figure 1:
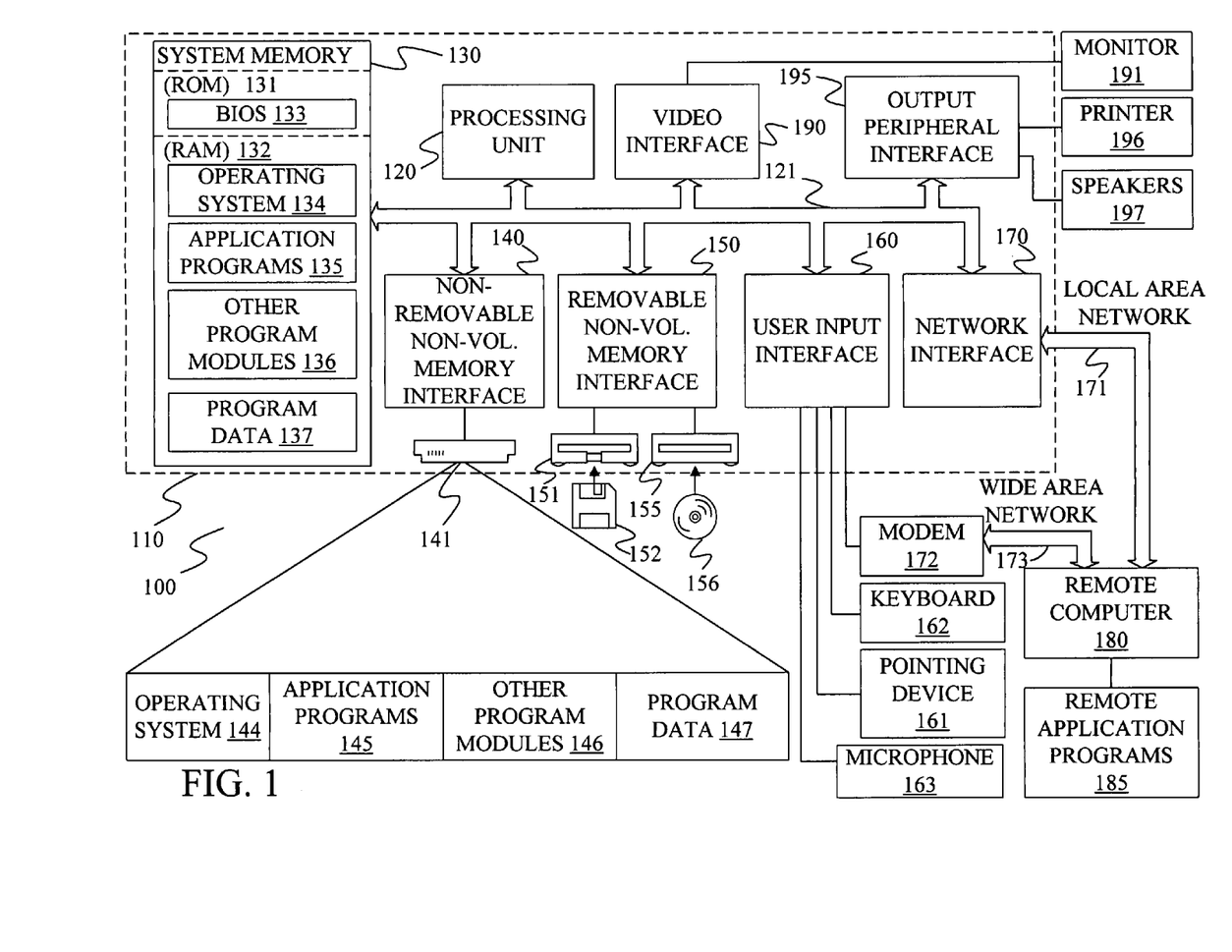
FIG. 1 is a block diagram of an exemplary general-purpose computer system suitable for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
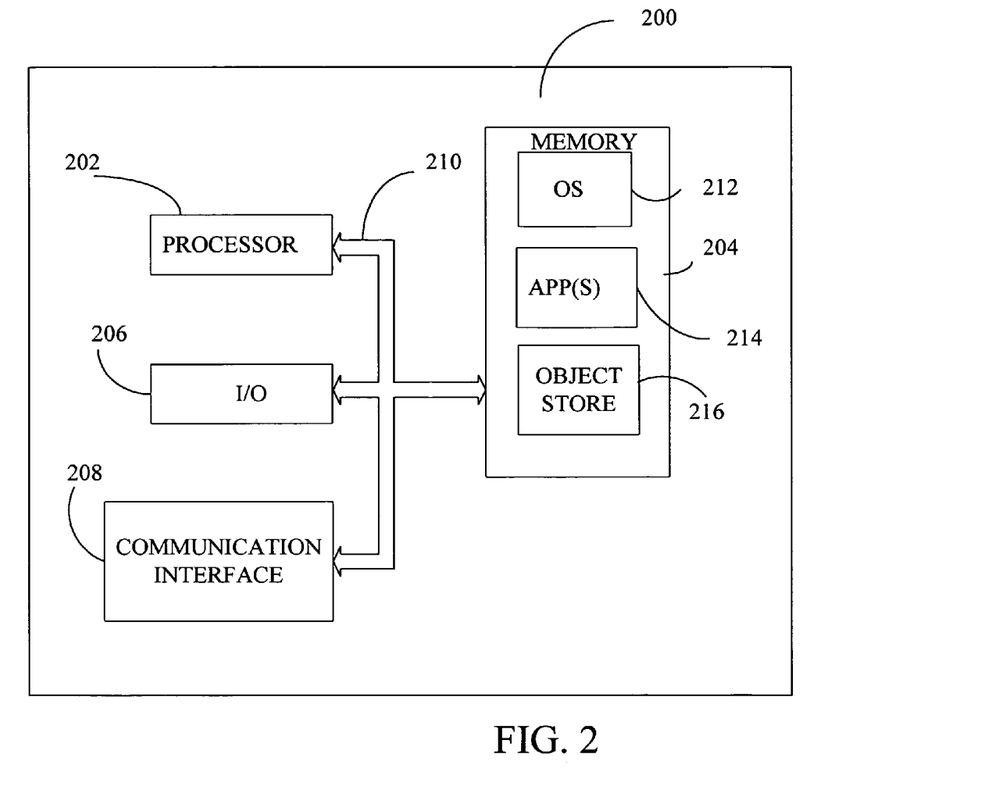
FIG. 2 is a block diagram of a hand-held device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212 at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
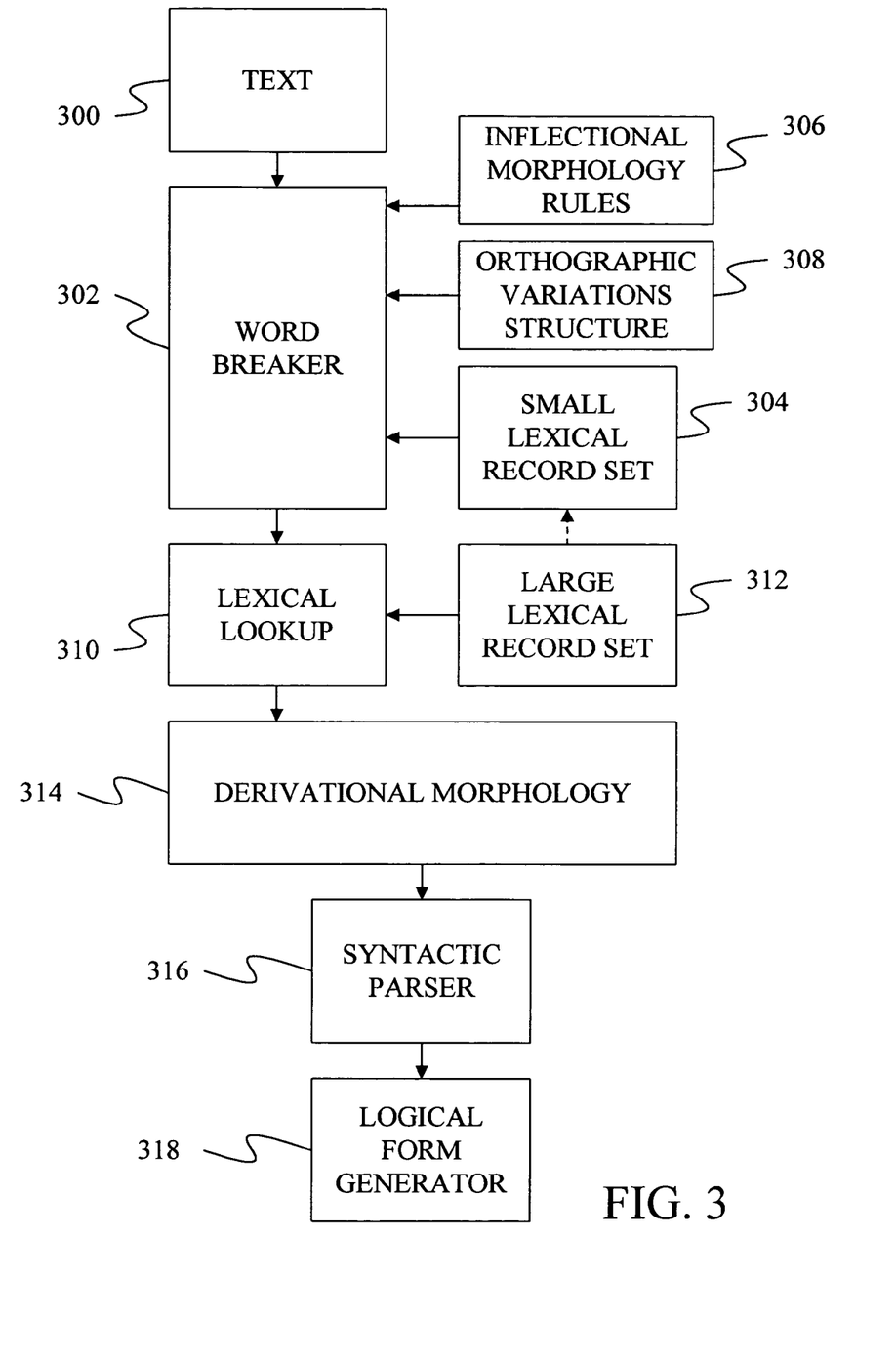
FIG. 3 is a more detailed block diagram of elements of one embodiment of the present invention.
Figure 4:
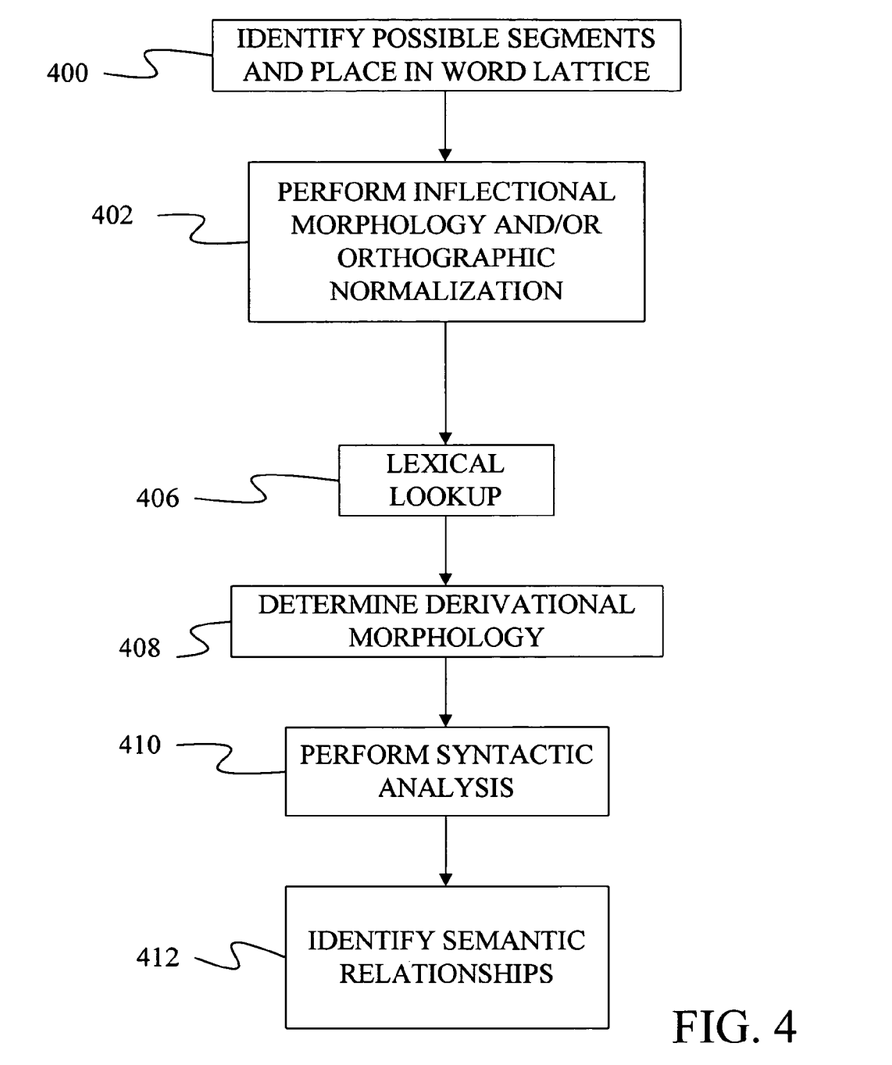
FIG. 4 is a flow diagram of a method of segmenting text using syntactic analysis according to an illustrative embodiment of the present invention.

Embodiments of the present invention provide a method and apparatus for segmenting text by providing orthographic and inflection variations to a syntactic parser. FIG. 3 is a block diagram of various components of one embodiment of the present invention. FIG. 4 is a flow diagram of a method under one embodiment of the invention using the components of FIG. 3.

In step 400 of FIG. 4, a word breaker 302 of FIG. 3 identifies combinations of contiguous characters in an input text 300 that appear in a small lexical record set 304. Lexical record set 304 is small in the sense that there is a limited amount of grammatical information stored for each word. Lexical record set 304 does not necessarily contain a small number of words, and in fact, in some embodiments, small lexical record set 304 contains a large number of words.

Under one embodiment of the invention, word breaker 302 searches for words in small lexical record set 304 by using a data structure known as a trie. In the trie, the words are not listed sequentially, but are instead represented by chains of states. Each state represents an individual character and includes one or more child states, with each child state containing a character that occurs after the character in the current state in at least one word of small lexical record set 304. Each state also indicates whether the current character occurs as the last character in a word formed through the chain of states proceeding the current character. Using the trie data structure, possible words in a character string such as ABCD can be determined in parallel. For example, the system will begin at the state associated with character A. If that state indicates that the character A appears alone as a word in small lexical record set 304, "A" would be identified as a possible segment for the string. The system would then check to see if there is a child state for character B extending from the state for character A. If there is a B child state, the B state is checked to see if the character B is the final character for any words. If it is, the string AB is identified as a possible segment. The system then looks to see if there is a child state for character C extending from the state for character B. If there is no child state for the character C extending from the current state, the system stops tracing the current chain and begins tracing a new chain starting with character B. The process of starting new chains is repeated for each character in the input string so that each character is tested as a possible beginning of a chain.

Once the words stored in small lexical records set 304 have been identified at step 400, the method of FIG. 4 continues at step 402 where word breaker 302 uses inflectional morphology rules 306 to identify words that may not be stored in the small lexical record set 304 but that may have their lemmas stored in small lexical record set 304. The lemma is the canonical form of the word by which it is stored in a dictionary or lexical database. For example, if a substring ABC is found in a string of text, and the inflectional morphology rules state that the character substring BC indicates the past tense for some verbs and that the lemma of these verbs can be formed by =taking the characters proceeding the BC substring and combining them with a new character Q, the inflectional morphology would identify the lemma AQ from the substring ABC. In some embodiments of the invention, derivational morphology analysis rules, which are discussed below in connection with step 408, are also applied in step 402.

Before adding the lemma to the word lattice, the system searches the small lexical record set 304 to ensure that the lemma is a word within the language. If the lemma is a word within the language, the lemma is added to the word lattice along with the lexical information for the lemma stored in record set 304 and any information about the word provided by the inflectional morphology. For instance, the record placed in the word lattice may indicate the tense of the lemma that was found in the input text string. The record placed in the word lattice for the lemma also indicates the starting position and the ending position for the string of characters in the input string that were used to find the lemma. For example, if four characters were used to represent the past tense of a lemma that only contains two characters, the record for the lemma would indicate that the lemma fills the space occupied by the four characters instead of just the two characters of the lemma. This allows the lemma to be combined with other segments in the sequence of characters even though the lemma has a different number of characters than the string of characters used to find the lemma.

While performing the inflectional morphology, the method of FIG. 4 also performs orthographic normalization to normalize different spellings of words. By performing this normalization, not all spellings need to be stored in the small lexical record set 304. Instead, only one preferred spelling is stored in the small lexical record set.

To normalize the orthography of a string of characters, word breaker 302 accesses a data structure 308, which links respective preferred orthographic forms of selected words to the orthographic variations for that word. Using data structure 308, word breaker 302 searches for the string of characters found in a possible segment of the input text. If it finds the string of characters in data structure 308, word breaker 302 uses data structure 308 to identify the preferred form for the word. This preferred form is then inserted into the word lattice along with the word's associated lexical information and the starting and ending positions of the segment that was normalized.

Note that the normalized form of a word may have more or fewer characters than the original segment it is based upon and may have different characters than those in the original segment. By storing the starting and ending position of the original segment in the record of the normalized form, the present invention allows the normalized form to be combined with other segments in the input string to identify a full segmentation for the input string of characters.

For Japanese embodiments, part of the orthographic normalization involves selecting a preferred combination of the four scripts commonly used in the Japanese language: kanji, hiragana, katakana, and the roman alphabet. Kanji is a set of fairly complex looking Japanese characters that were borrowed from Chinese. There are thousands of these characters in Japanese, and each character may have multiple "readings" (or pronunciations). Hiragana is a Japanese syllabary used to write out words based on their pronunciation. Katakana is another syllabary that is used primarily for foreign loanwords or to emphasize words in a sentence. Hiragana and katakana are sometimes referred to generically as kana.

Under one embodiment of the invention, orthographic data structure 308 takes the form of a collection of orthographic lattices, where each lattice represents a single word. For each word, the lattice indicates all of the orthographic forms for that word as well as the preferred orthographic form for the word.

Figure 5:
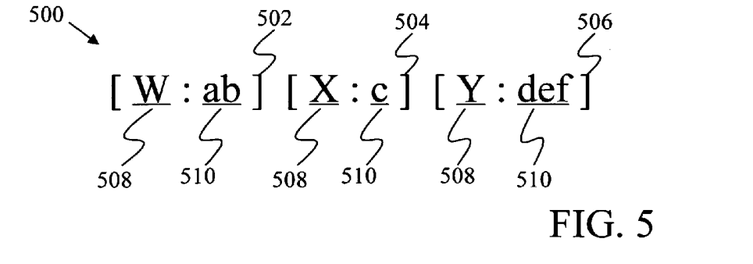
FIG. 5 is an orthographic lattice that is used under one embodiment of the present invention.

An example of such a lattice 500 is shown in FIG. 5. Lattice 500 is divided into three word-element fields 502, 504, and 506, denoted by brackets, that hold data representing a single element of a word. The single element in each bracket can be represented by a single character or multiple characters. Although three word-elements are shown in FIG. 5, those skilled in the art will recognize that any number of word-elements may be found in a lattice. Also note that if a word element did not have an alternative, it would appear as itself in the lattice without brackets.

Each word-element data field includes two subfields: preferred field 508 and alternate field 510. Preferred field 508 contains the primary or preferred form of the corresponding word element. In most Japanese embodiments, preferred field 508 contains a kanji character. Alternate field 510 contains data representing an alternate form of the corresponding word element. In most Japanese embodiments, alternate field 510 contains one or more kana characters. Any number of characters can be placed in either preferred field 508 or alternate field 510.

By way of example, the orthography lattice [W:ab] [X:cd] specifies a word that can be written as any of "WX", "Wcd", "abX", or "abcd", where a capital letter indicates a preferred representation for each element and a lower case letter indicates an alternate representation for each element.

In Japanese embodiments where kanji is normally preferred over kana, the lattice of the present invention even provides for "okurigana" variants. Okurigana refers to one or more kana characters that may optionally be appended to a kanji character in some spelling variants, but that must be appended to the kana alternative of the kanji character. Thus, if "X" is a kanji character, "a" is X's alternative kana character and "b" is the optional character, the variants "Xb" and "ab" are valid but "a" without "b" is not valid. Okurigana are represented in the lattice by commas. Thus, the lattice [W:a,b][X:c] would allow the following orthographies: "WX", "WbX", "Wc", "Wbc", "abX", and "abc", but not "aX" or "ac". Multiple okurigana for a single word element are represented by setting off each of the okurigana with a comma. For example, the lattice [W:a][X:b,c,d] allows the following acceptable variants: "WX", "WXd", "WXc", "Wbcd", "aX", "aXd", "axc" and "abcd".

Under one embodiment, the compiled lattice structures are used directly to convert possible word segments into their preferred orthographic form. Under this embodiment, the received character input is compared to the first word-element of each orthographic lattice. If the received character input matches either the preferred form or the alternate form of the first word-element of a particular lattice, the subsequent characters in the input string are compared to further word-elements in the particular lattice in order to ascertain whether any orthographic forms of the lexical entry corresponding to the particular lattice are present in the input string. If the input string matches a combination of word-elements in the lattice, a normalized representation of the input string is generated which includes the preferred form of each word-element of the orthographic lattice. The normalized form is then inserted into the word lattice that is being generated by word breaker 302.

In some Japanese embodiments, an additional structure is used in combination with the lattice above to reduce the computation time associated with accessing the lattice. This data structure includes one entry per word, with each entry having an all-kana field and a preferred form field. The all-kana field contains the word represented in only kana characters. The preferred form field contains the preferred orthographic form for the word that is to be placed in the word lattice. This additional structure allows for a fast look-up of input strings that contain only kana characters. Instead of accessing the relatively complex orthographic lattice structure, word breaker 302 instead performs a simple look-up in the kana structure to find the preferred form for the all-kana string. In some embodiments, the kana structure is organized as a trie structure similar to the trie structure described above.

In some embodiments, the lattice and the all-kana data structure are augmented with a look-back data structure, which further reduces the computational time associated with accessing the lattice. The look-back data structure allows the lattice to be indexed based only on preferred characters so that the initial search for a matching lattice involves comparing only preferred characters and not alternative characters. Under this embodiment, when the input string begins with a preferred character, words beginning with the preferred character are searched for directly in the orthographic lattice using the word's preferred characters. However, when the input string begins with a non-preferred (alternative) character, the look-back data structure is searched using the first preferred character that appears in the input string. For example, if the input string is "abxc", where "a", "b", "c" are alternative characters and "X" is a preferred character, the look-back data structure would be searched for entries corresponding to "X".

Each look-back entry corresponds to a particular orthographic form of a word. It is indexed based on the first preferred character in the orthographic form. Each entry also indicates the number of alternative characters that precede this first preferred character in the orthographic form and the identity of the first alternative character in the form. For example, for the orthographic form "abcYdef", the entry would indicate that three alternative characters precede the preferred character and that the first alternative character is "a". The entry also indicates which preferred character is first in the preferred orthographic form of the word. For example, if "VXYZ" were the preferred orthographic form of the word "abcydef", the entry would indicate that "V" is the first preferred character of the word's preferred form.

As mentioned above, the look-back data structure is accessed when an input string does not begin with a preferred character but does include a preferred character. The first preferred character in the input string is used to search the look-back structure to find an entry for that character. The character in the input string that precedes the search character by the difference indicated by the look-back indicator is then evaluated. If the evaluated character matches the alternative character stored in the look-back entry, the preferred form of the first word element in the look-back entry is used to search the orthographic lattices. For each entry in the orthographic lattices that starts with this preferred form, word breaker 302 compares the original input-string to the lattice entry to see if any orthographic forms in the entry match the input string. If there is a match, the preferred orthographic form for the word is inserted in the word lattice.

In some embodiments, the first preferred character in some of the look-back entries is part of a word element that includes a sequence of preferred characters. In such embodiments, characters in the input string subsequent to the input character used to search the look-back structure are respectively compared with the preferred characters that constitute the element in the entry. If these values do not match, the lattice search is not performed.

After word breaker 302 has performed the inflectional morphology and the orthographic normalization of step 402, the word lattice consists of words that can be formed directly from segmenting the characters in the input text and variants of words in the input text. As mentioned above, these variants can include more or fewer characters than the words they are variants of and can include characters that are not present in the input text. Thus, the word lattice produced by word breaker 302 can contain different characters than those present in the input text.

The word lattice produced by word breaker 302 is provided to a lexical look-up 310 that has access to a large lexical record set 312. Large lexical record set 312 includes more lexical information than is found in small lexical record set 304. In fact, in many embodiments, small lexical record set 304 is built from and periodically updated with reference to the large lexical record set 312.

Using large lexical record set 312, lexical look-up 310 expands the amount of lexical information stored in the word lattice for each word in the lattice at step 406 of FIG. 4. Such additional information includes items such as the origin of the word, whether the word can be used in proper nouns, and other lexical and grammatical details of the word.

The word lattice, with its expanded lexical information, is passed from lexical look-up 310 to derivational morphology 314. At step 408 of FIG. 4, derivational morphology 314 combines contiguous segments of characters in the word lattice to form larger multi-segment words. For example, derivational morphology component 314 is able to append, insert, and prepend suffix character strings, infix character strings, and prefix character strings to other segments to form larger words. In some embodiments, some or all of these derivational morphology rules are applied in step 402 by word breaker 302, rather than in step 408 by morphology component 314. However, application in morphology component 314 offers the advantage of allowing the richer information available in the large lexical record set to be input to the derivational morphology rules. In addition, derivational morphology component 314 can combine segments for the identification and extraction of named entities, such as the names of people, institutions, and geographical locations and other proper names, and other units such as dates and times.

The larger words constructed by derivational morphology 314 are added to the word lattice along with lexical information for the larger words. In most embodiments, the larger words constructed by derivational morphology 314 do not replace the smaller segments, but instead are placed in the lattice in addition to the smaller segments.

The expanded word lattice produced by derivational morphology 314 typically includes one or more segments that overlap. Such overlapping segments include segments derived directly from the input string of characters that have one or more characters in common. The overlapping segments also include variants formed through inflectional morphology or orthographic normalization that are generated from segments in the input string that overlap one or more other segments.

The expanded word lattice produced by derivational morphology 314 is provided to a syntactic parser 316, which performs a syntactic analysis using the expanded word lattice at step 410 of FIG. 4. In one embodiment, the syntactic analysis is performed using a bottom-up chart parse that creates a syntactic parse by building incrementally larger phrases from smaller words and phrases. To build the larger phrases, syntactic parser 316 applies grammar rules that examine the lexical designation of words or phrases to determine how they can be combined to form a larger word or phrase. In one embodiment, a binary grammar is used that examines two adjoining words or phrases to determine how they can be combined.

The syntactic analyses performed by syntactic parser 316 take into consideration all of the segments in the expanded word lattice. The parser is constrained so that it only combines segments that represent adjoining characters in the original input text, and that the final analysis spans the entire input text. Thus, the syntactic parser cannot produce a valid parse involving two segments that overlap, or for a group of segments that do not represent the entirety of the input string.

Under one embodiment, syntactic parser 316 produces a single parse at its output. This single parse identifies the relationship between a group of words found in the word lattice. Because of the inflectional morphology and the orthographic normalization that was performed to construct the word lattice, this valid parse can include words in forms that were not originally found in the input text. The resulting valid parse includes a valid segmentation of the input text that is selected from a plurality of possible segmentations found in the word lattice. Since the syntax parser inherently selects one segmentation from a group of overlapping segments, the present invention does not require a separate segmentation unit that identifies a proper segmentation before the syntactic parser. Instead, the syntactic parser itself selects a most likely segmentation for the input text.

The segmentation produced by the present invention is more sophisticated than prior art segmentations since the syntactic parser is operating on characters that were not necessarily present in the input text itself. Thus, the resulting segmentation provided by the syntactic parser is based on word forms that were not present in the input text and that would not have been considered by prior art segmentation systems.

In other embodiments, syntactic parser 316 generates a plurality of valid syntactic parses, each representing a separate valid segmentation of the input text. In one embodiment, each of these valid parses is passed to a logical form generator 318 that identifies semantic relationships within each of the parses. The semantic relationships can then be used to select which of the valid parses is most likely the correct parse for the input string. This semantic identification is shown as step 412 in FIG. 4.

Although the present invention has been described with reference to particular embodiments, workers skilled in the art will recognize that changes may be made in form and detail without departing from the spirit and scope of the invention.

What is claimed is:

1. A method for segmenting an input sequence of characters from a non-segmented language, the method comprising:
identifying possible segments in the sequence of characters, at least two of the possible segments overlapping each other;
identifying an alternative sequence of characters for at least one of the possible segments, the alternative sequence of characters forming an alternative segment that fills the same space as one of the possible segments; and
performing multiple syntactic analyses using the possible segments and the alternative segment, the analyses resulting in a full syntactic parse that utilizes and thereby results in a segmentation of the input sequence of characters.

2. The method of claim 1 wherein performing multiple syntactic analyses comprises performing analyses that result in a parse containing the alternative segment.

3. The method of claim 1 wherein identifying an alternative sequence of characters for a possible segment comprises identifying an alternative sequence of characters that has a different number of characters than the possible segment.

4. The method of claim 3 wherein performing multiple syntactic analyses comprises treating an alternative segment that has a different number of characters than the possible segment for which it is an alternative as if it had the same number of characters as the possible segment for which it is an alternative.

5. The method of claim 1 wherein identifying an alternative sequence of characters comprises performing inflectional morphology on a possible segment.

6. The method of claim 1 wherein identifying an alternative sequence of characters comprises identifying orthographic variations of a possible segment.

7. The method of claim 6 wherein identifying orthographic variations comprises identifying a preferred orthographic form for the possible segment.

8. The method of claim 1 wherein identifying orthographic variations comprises identifying orthographic variants that use a script other than the script of the characters in the possible segment.

9. A system for identifying syntax in a string of characters from a non-segmented language, the system comprising:
a word breaker that generates a collection of words from the string of characters, the collection of words comprising at least two words that are derived in part from the same character in the string of characters, the word breaker utilizing:
a lexical record set that is used to derive words for the collection of words by taking the words directly from the string of characters, at least two of the words taken directly from the string of characters partially overlapping each other in the string of characters; and
a variants constructor that is used to derive word variants of words found in the string of characters where the word variants are not found in the string of characters, each word variant being added to the collection of words and having a different sequence of characters than the sequence of characters associated with the word in the string of characters from which it is derived; and
a syntax parser that performs a syntactic analysis using the collection of words produced by the word breaker to produce a syntax parse, the syntax parse indicating the syntax of the entire sting of characters.

10. The system of claim 9 wherein the variants constructor comprises inflectional morphology rules.

11. The system of claim 10 wherein the inflectional morphology rules are capable of identifying a word's lemma from its inflectional form in the string of characters.

12. The system of claim 9 wherein the variants constructor comprises an orthographic variants structure that indicates the orthographic variants of words found in the string of characters.

13. The system of claim 9 wherein at least one word variant has a different number of characters than the word from which it is derived.

14. The system of claim 9 wherein at least one word variant includes a character that is not present in the string of characters.

15. A computer-readable medium having computer-executable instructions for performing steps comprising:
receiving a sequence of characters that represent a phrase for a non-segmented language;
identifying a variant for a first group of characters in the sequence of characters, the variant containing a different collection of characters than the collection of characters in the first group of characters while being considered to fill the space of the first group of characters;

identifying a second group of characters in the sequence of characters that overlaps the first group of characters; and performing a syntactic analysis using the variant and the second group of characters to produce a syntactic parse, the syntactic parse containing either the variant or the second group of characters.

16. The computer-readable medium of claim 15 wherein identifying a variant for a first group of characters comprises identifying a variant that has a character that is not present in the first group of characters.

17. The computer-readable medium of claim 15 wherein identifying a variant for a first group of characters comprises identifying a variant that has a different number of characters than the first group of characters.

18. The computer-readable medium of claim 17 wherein identifying a variant comprises identifying a variant that has fewer characters than the first group of characters.

19. The computer-readable medium of claim 17 wherein identifying a variant comprises identifying a variant that has more characters than the first group of characters.

20. The computer-readable medium of claim 15 wherein identifying a variant for a first group of characters comprises performing inflectional morphology on the first group of characters.

21. The computer-readable medium of claim 20 wherein the variant is a lemma of a word represented by the first group of characters.

22. The computer-readable medium of claim 15 wherein identifying a variant for a first group of characters comprises identifying an orthographic variant of a word represented by the first group of characters.

23. The computer-readable medium of claim 22 wherein identifying an orthographic variant of a word comprises identifying a preferred orthographic form for a word.

24. The computer-readable medium of claim 22 wherein identifying an orthographic variant of a word comprises identifying a variant containing at least one character of a different script from the script of the characters in the first group of characters.

* * * * *

UNITED STATES PATENT AND TRADEMARK OFFICE
CERTIFICATE OF CORRECTION

| | | |
|---|---|---|
| PATENT NO. | : 6,968,308 B1 | |
| APPLICATION NO. | : 09/704039 | |
| DATED | : November 22, 2005 | |
| INVENTOR(S) | : Brockett et al. | |

It is certified that error appears in the above-identified patent and that said Letters Patent is hereby corrected as shown below:

On page 2, in field (56), under "Other Publications", in column 1, line 6, delete "Statisatical" and insert -- Statistical --, therefor.

In column 6, lines 24–42, delete "Using the trie data structure, possible words in a character string such as ABCD can be determined in parallel. For example, the system will begin at the state associated with character A. If that state indicates that the character A appears alone as a word in small lexical record set 304, "A" would be identified as a possible segment for the string. The system would then check to see if there is a child state for character B extending from the state for character A. If there is a B child state, the B state is checked to see if the character B is the final character for any words. If it is, the string AB is identified as a possible segment. The system then looks to see if there is a child state for character C extending from the state for character B. If there is no child state for the character C extending from the current state, the system stops tracing the current chain and begins tracing a new chain starting with character B. The process of starting new chains is repeated for each character in the input string so that each character is tested as a possible beginning of a chain."

Column 6, line 25, insert as new paragraph:
-- Using the trie data structure, possible words in a character string such as ABCD can be determined in parallel. For example, the system will begin at the state associated with character A. If that state indicates that the character A appears alone as a word in small lexical record set 304, "A" would be identified as a possible segment for the string. The system would then check to see if there is a child state for character B extending from the state for character A. If there is a B child state, the B state is checked to see if the character B is the final character for any words. If it is, the string AB is identified as a possible segment. The system then looks to see if there is a child state for character C extending from the state for character B. If there is no child state for the character C extending from the current state, the system stops tracing the current chain and begins tracing a new chain starting with character B. The process of starting new chains is repeated for each character in the input string so that each character is tested as a possible beginning of a chain. --

UNITED STATES PATENT AND TRADEMARK OFFICE
CERTIFICATE OF CORRECTION

PATENT NO. : 6,968,308 B1
APPLICATION NO. : 09/704039
DATED : November 22, 2005
INVENTOR(S) : Brockett et al.

It is certified that error appears in the above-identified patent and that said Letters Patent is hereby corrected as shown below:

In column 6, line 54, after "by" delete "=".

In column 8, line 34, delete "axc" and insert -- aXc --, therefor.

In column 9, line 15, delete "abxc" and insert -- abXc --, therefor.

In column 9, line 31, delete "abcydef" and insert -- abcYdef --, therefor.

In column 12, line 42, in Claim 9, delete "sting" and insert -- string --, therefor.

Signed and Sealed this

Twenty-fifth Day of August, 2009

David J. Kappos
*Director of the United States Patent and Trademark Office*